(12) United States Patent
Baumeister et al.

(10) Patent No.: US 11,207,792 B2
(45) Date of Patent: Dec. 28, 2021

(54) GRIPPER, CUTTING APPARATUS AND METHOD FOR CUTTING A PRODUCT

(71) Applicant: WEBER MASCHINENBAU GmbH BREIDENBACH, Breidenbach (DE)

(72) Inventors: Christian Baumeister, Mudersbach-Birken (DE); Fabian Jung-Saßmannshausen, Bad Endbach (DE); Philip Kahl, Frankenberg (DE); Michael Knauf, Amöneburg (DE); Christoph Kuhmichel, Bad Laasphe (DE); Andreas Runkel, Biedenkopf (DE); Thorsten Schneider, Weimar (DE)

(73) Assignee: Weber Maschinenbau GmbH Breidenbach

( * ) Notice: Subject to any disclaimer, the term of this patent is extended or adjusted under 35 U.S.C. 154(b) by 199 days.

(21) Appl. No.: 15/886,542

(22) Filed: Feb. 1, 2018

(65) Prior Publication Data

US 2018/0222074 A1 Aug. 9, 2018

(30) Foreign Application Priority Data

Feb. 7, 2017 (DE) ......................... 102017102385.2

(51) Int. Cl.
*B26D 7/01* (2006.01)
*B26D 7/06* (2006.01)
(Continued)

(52) U.S. Cl.
CPC .......... *B26D 7/018* (2013.01); *B25J 15/0616* (2013.01); *B26D 7/0633* (2013.01); *A47J 43/18* (2013.01);
(Continued)

(58) Field of Classification Search
CPC .................. B26D 7/018; B26D 7/0633; B26D 2007/011; B26D 2210/902; A47J 43/18; B25J 15/0616
See application file for complete search history.

(56) References Cited

U.S. PATENT DOCUMENTS 2,487,271 A * 11/1949 Petri ..................... A21C 11/002
83/98
2,895,739 A 7/1959 Smith et al.
(Continued)

FOREIGN PATENT DOCUMENTS

DE 2614488 A1 10/1976
DE 2746119 A1 4/1978
(Continued)

OTHER PUBLICATIONS

Official Communication from German Patent Office for related German U.S. Appl. No. 18/154,048 5; dated Jul. 27, 2018; 1 page.
(Continued)

*Primary Examiner* — Ghassem Alie
*Assistant Examiner* — Fernando A Ayala
(74) *Attorney, Agent, or Firm* — Dickinson Wright PLLC (57) ABSTRACT

The present invention relates to a gripper for gripping a product, in particular a food product, having a suction device which has a contact surface which can be brought into contact with a section, in particular with an end section, of the product, wherein the suction device comprises at least one first suction section which is bounded in the radial direction by a sealing device and which is in communication with a pumping device generating a vacuum; and at least one sealing section which is arranged outside the first suction section viewed in the radial direction of the contact region and at least sectionally, in particular completely, surrounds it in the radial direction. The present invention relates to a
(Continued)

cutting apparatus having a corresponding gripper and to a method for cutting a product.

23 Claims, 8 Drawing Sheets (51) Int. Cl.
    *B25J 15/06*     (2006.01)
    *A47J 43/18*     (2006.01)

(52) U.S. Cl.
    CPC .... *B26D 2007/011* (2013.01); *B26D 2210/02* (2013.01)

(56) References Cited

U.S. PATENT DOCUMENTS

| | | | |
|---|---|---|---|
| 3,361,469 A | | 1/1968 | Yeager, Jr. |
| 3,797,343 A | | 3/1974 | Miller et al. |
| 3,880,295 A | | 4/1975 | Wyslotsky |
| 4,014,494 A | | 3/1977 | Glagolev et al. |
| 4,058,040 A | | 11/1977 | Fisher |
| 4,428,263 A | | 1/1984 | Lindee et al. |
| 5,386,751 A | * | 2/1995 | Dylla ............... B26D 7/018 225/93 |
| 5,782,152 A | * | 7/1998 | Reis ................. B25B 11/005 83/22 |
| 7,493,841 B1 | * | 2/2009 | Kaplan ............. B26D 1/147 241/262 |
| 2005/0034576 A1 | | 2/2005 | Ray et al. |
| 2006/0216969 A1 | | 9/2006 | Bright et al. |
| 2009/0149986 A1 | | 6/2009 | Kim et al. |
| 2010/0303641 A1 | * | 12/2010 | Medow ............. B25J 15/0625 417/188 |
| 2011/0203924 A1 | * | 8/2011 | Wohlstadter ........... G01N 21/69 204/403.01 |
| 2014/0144303 A1 | * | 5/2014 | Muller ............... B26D 7/018 83/100 |
| 2015/0239131 A1 | * | 8/2015 | Didiot ............... A23P 20/20 53/203 |
| 2019/0039838 A1 | * | 2/2019 | Curhan ............... B25J 9/142 |
| 2019/0061194 A1 | * | 2/2019 | King ................. B26D 3/28 |
| 2019/0143552 A1 | * | 5/2019 | Baum ............... B26D 7/018 |

FOREIGN PATENT DOCUMENTS

| | | |
|---|---|---|
| DE | 3010732 A1 | 10/1981 |
| DE | 19806561 A1 | 8/1999 |
| DE | 19908931 A1 | 10/1999 |
| DE | 10024913 A1 | 11/2001 |
| DE | 10124118 A1 | 12/2002 |
| DE | 10304773 A1 | 8/2004 |
| DE | 102005010184 A1 | 9/2006 |
| DE | 102008011980 B3 | 7/2009 |
| DE | 102008011985 B3 | 7/2009 |
| DE | 102008011979 A1 | 9/2009 |
| DE | 102011012880 A1 | 4/2012 |
| DE | 102011083498 A1 | 3/2013 |
| DE | 102014101626 A1 | 8/2015 |
| DE | 102014215102 A1 | 2/2016 |
| EP | 1400324 A1 | 3/2004 |
| EP | 2105393 A1 | 9/2009 |
| EP | 2149517 A2 | 2/2010 |
| EP | 2415696 A1 | 2/2012 |
| EP | 2535299 A1 | 12/2012 |
| EP | 2554344 A1 | 2/2013 |
| EP | 2837289 A1 | 2/2015 |
| EP | 2842702 A1 | 3/2015 |
| FR | 1521022 | 4/1968 |
| FR | 2224375 | 10/1974 |
| GB | 2205558 A | 12/1988 |
| WO | 9908843 A2 | 2/1999 |
| WO | 03006219 A1 | 1/2003 |
| WO | 2012041491 A1 | 4/2012 |
| WO | 2016083084 A1 | 6/2016 |

OTHER PUBLICATIONS

Official Communication from German Patent Office for related German Application No. 102017102385.2; dated Nov. 23, 2017; 2 pages.

* cited by examiner

GRIPPER, CUTTING APPARATUS AND METHOD FOR CUTTING A PRODUCT

The present invention relates to a gripper for gripping a product, in particular a food product. The gripper in particular serves as a product holder.

Such grippers are, for example, used in food technology in the supply region of high-performance slicing machines when it is a question of slicing a food product into slices. In this respect, rotating circular and scythe-like blades are used which correspond with a cutting edge at the termination of the supply region. The food product is in this respect generally placed into a feeding device which allows the product to be supplied to a cutting plane in a well-defined manner. An end section of the product is additionally grasped and reliably held by the gripper. The product is essentially transported toward the cutting plane by the feeding device during the cutting process. However, the closer the cutting plane comes to the end section of the food product, the more difficult it becomes to ensure the feeding of the product and its positionally accurate fixing solely by the feeding device. Substantial transverse forces namely act on the product to be cut in the cutting process and have to be reliably compensated. These transverse forces above all depend on the resistance of the product against the penetration of the cutting blade.

A transport belt is typically used which in particular ensures a reliable feeding of the product and its fixing when the surface of the product lying on the belt is as large as possible. This surface becomes smaller and smaller toward the end of the cutting process so that the fixing of the product by the gripper becomes more and more important. On the one hand, the gripper has to ensure that the product is reliably transported toward the cutting plane. On the other hand, it has to ensure that the product is held securely and—depending on the application—is also retracted with short cutting interruptions for the portion preparation.

It is generally known to grasp a product by means of a suction gripper. Conventional suction grippers are, however, frequently not able to hold the product in a sufficiently reliable manner in particular toward the end of the cutting process. In addition, an uncontrolled rupturing of the end section should be avoided. This has the result that comparatively large end sections of the product cannot be cut and become cost-raising waste.

Mechanical grippers are known which ensure a fixing of the product by means of claws penetrating into the product. In order to ensure a sufficiently good fixing, the claws have to penetrate comparatively deeply into the product, however. This in turn means that a comparatively large end section of the product can likewise not be cut here, which has the result of correspondingly large amount of waste. Use of the end section is also only possible with restrictions since the claws leave their tracks in the end section.

A possible area of use of a gripper was described purely by example above. It is, however, understood that comparable problems also occur in other fields.

It is therefore an object of the present invention to provide a gripper by which a product can be securely held without any deep mechanical engagement into the product being necessary.

The object described above is satisfied by a gripper in accordance with any one of the independent claims.

In accordance with the invention, the gripper has a suction device which has a contact surface which can be brought into contact with a section, in particular with an end section, of the product. The suction device comprises at least one first suction section which is bounded in the radial direction by a sealing device and which is in communication with a pumping device generating a vacuum. The suction device further comprises a sealing section which is arranged outside the first suction section viewed in the radial direction of the contact surface and at least sectionally, in particular completely, surrounds it in the radial direction.

The sealing section thus—in addition to the sealing device—ensures a reliable sealing of the suction section with respect to the external space such that the suction power provided there—for example in a corresponding suction space—generates a vacuum reliably fixing the product. The sealing device of the first suction section can also be a part of the contact surface. Any kind of vacuum pump can generally be considered as a pumping device. The use of ejector pumps (also called injectors), however, in particular proves to be advantageous in food technology.

The initially described object is also satisfied by a gripper having a suction device which has a contact surface which can be brought into contact with a section, in particular with an end section, of the product, wherein the suction device has at least one first suction section which is bounded in the radial direction by a sealing device and which is in communication with a pumping device generating a vacuum, wherein the shape of the first suction section—in particular also the shape of the sealing device of the first suction section—is at least sectionally adaptable to a shape of the surface of the section of the product.

Due to the adaptability of the first suction section, it can nestle at the product contour, which has a positive effect on the leak-tightness of the parts of the suction device which are in contact with the product. This in turn ultimately ensures an improved fixing of the product.

For this purpose, the suction device can at least sectionally comprise an elastic material. Alternatively or additionally, it is conceivable to design the suction device such that it has a section of modifiable stiffness. This section which is elastic and/or modifiable with respect to its stiffness can be designed as having a large area or can also only be provided locally. For example, it is provided in regions which are arranged between the suction section and the external space in order to thus function as the sealing device and/or to supplement it. A modifiable stiffness can be provided by electrorheological/magnetorheological units. It is also conceivable to provide elements which contain liquid and which are then iced over. In a corresponding embodiment, the gripper is pressed toward the end section of the product and (locally) adapts to its shape in the process. The shape of the suction section is subsequently fixed, for instance by the application of an electric field/magnetic field or by a cooling in the above-mentioned examples.

A further solution of the initially mentioned problem is provided by a gripper which has a suction device having a contact surface, wherein the suction device has at least one first suction section which is bounded in the radial direction by a sealing device and which is in communication with a pumping device generating a vacuum. The suction device is arranged laterally movable in an active or passive manner in at least one plane of the contact surface. It is also conceivable that the suction device has a plurality of sections which are arranged laterally movable in an active or passive manner in at least one plane of the contact surface. These sections are arranged such that they are movable separately from one another in accordance with an embodiment.

With this gripper, transverse forces which e.g. occur on the penetration of the cutting blade into the product and which act on the product, and thus ultimately on the sealing device, are compensated in that a relatively slight lateral evasion of the gripper or of sections of the gripper is permitted. The vibrations occurring on the cutting then put a smaller load on the sealing device, whereby the efficiency of the suction device and thus the reliability of the fixing of the product are increased. The suction device is in particular movably arranged by means of a deflection arrangement which comprises a fixing unit by which the lateral movability of the suction device can be selectively influenced or controlled, with the fixing unit in particular being designed such that different sections of the suction device can be selectively influenced or controlled in order to allow a different lateral movability of different sections of the suction device.

It is understood that the amplitude of the movement of the gripper can be restricted and/or can be influenced by suitable abutments and/or by "braking" or dissipative components. The use of electrorheological/magnetorheological elements, mechanical "brakes" or similar is conceivable, for example. The components can also be designed such that they also ensure a complete fixing of the gripper with respect to a lateral deflection movement if required. The lateral movability of the gripper can, for example, be provided by elastic devices and/or articulated devices.

A further possibility of solving the initially mentioned problem is provided in accordance with the invention by a gripper which has a suction device which has a contact surface which can be brought into contact with a section, in particular with an end section, of the product, wherein the suction device comprises at least one first suction section which is bounded in the radial direction by a sealing device and which is in communication with a pumping device generating a vacuum. A cooling device is provided by which the suction device and/or the product can at least sectionally be cooled, in particular directly or indirectly by means of a coolant.

In other words, the product is not only fixed by the suction device, but an assisting fixing is provided by an at least sectional icing over. The icing over establishes an additionally fixing connection between the product and the suction device.

It is generally conceivable to produce an at least local cooling of the suction device or of the product by a Peltier element. The use of a coolant is, however, to be preferred in many cases. A coolant can, for example, be transported through suitable coolant passages in the gripper to the desired points. Liquid nitrogen, brine or undercooled compressed air can, for example, be considered as coolants.

The cooling device can be configured such that the suction device can be cooled in a region which extends at least sectionally, in particular completely, around the first suction section in the radial direction. The icing over produced thus at least partly surrounds the first suction section and assists its sealing with respect to the external space in this manner. In addition, a practically automatic adaptation to irregularities of the product surface is thereby achieved. The cooling or even icing over of the product moreover increases its strength and possibly results in the closing of pore spaces which can cause leakage flows. In contrast to mechanical gripping hooks, the product is furthermore not damaged. An increase in the product strength by the icing over can simplify the cutting of the product and/or counteract a "rupturing" of gripping apparatus mechanically engaging into the product (see below).

The cooling device can furthermore be configured such that the coolant can be injected into the first suction section in order to quickly cool the relevant surfaces of the product and of the gripper. An evacuation of the suction section and an introduction of the coolant in one or more cycles increase the efficiency of the cooling. Alternatively or additionally, the cooling device can also be configured such that water can be injected into the first suction section. For example, water (or a water-air mixture) is first injected into a suction space or a plurality of suction spaces of the suction device. Surfaces of the gripper facing the product are then cooled, whereby the water is frozen and a fixing icing over arises. The gripper can be (locally) heated to eject the end piece. It is also conceivable to introduce water only after a single or multiple introduction of the coolant—for example nitrogen or undercooled compressed air which is, for instance, produced directly at the gripper by a Ranque-Hilsch vortex tube—wherein the vacuum which can be generated by the pumping device is used for this purpose in order to achieve a better distribution of the water and thus a more uniform icing over.

In accordance with an advantageous embodiment, the sealing section comprises at least one second suction section which is bounded in the radial direction by a second sealing device and which is in communication with the pumping device generating the vacuum. The second suction section thus forms a functional component which at least partly shields the first suction section toward the outside—viewed in the radial direction—and which develops an additionally fixing and sealing effect. The corresponding sealing section can likewise be cooled; provision can in particular be made that a coolant and/or water can be injected into the second suction section.

The first sealing device and/or the second sealing device is/are at least sectionally designed as a blade edge. Such a blade edge penetrates into the product on a gripping of the product by the gripper and plastically deforms said product locally.

It is also possible to design the first sealing device and/or the second sealing device at least sectionally as a bead or as a sealing lip. The surface of the product is essentially only deformed elastically and only slightly compacted by a bead. A sealing lip lies tightly on the product with an only insignificant deformation thereof.

The selection of the suitable sealing device inter alia depends on the properties of the product to be gripped. Sealing devices of different designs can, if required, also be combined as desired in a gripper in order to take account of the respective present demands.

An additional improvement in the sealing effect of the sealing devices can be achieved if they have suction openings in communication with the pumping device. They can then be reliably pressed toward the product surface by means of a vacuum.

In accordance with a further embodiment, the first sealing device and/or the second sealing device is/are shaped such that a local compression of the product which can be brought into contact with the sealing device can be produced. The first sealing device and/or the second sealing device is/are in particular at least sectionally wedge-shaped. It is particularly efficient if two mutually oppositely disposed slopes are provided which diverge in a direction toward the product. On a gripping of the product, it is compressed by the V-shaped design of the space disposed between the slopes, which leads to the closing of possibly present pores in the product and to a good adhesion. In other words, the contact force and thus the sealing effect between the product and the contact slope are increased.

The first suction section and/or the sealing section can be divided into at least two segments by at least one wall section. A surface of a corresponding wall section facing the product can form a part of the contact surface, with the surface preferably being provided with a sealing device, claws and/or tips. Sealing devices, claws, pins, tips, blade edges, beads, sealing lips or similar can be provided at the surface as required in order to further improve the fixing.

The contact surface—irrespective of whether it lies in the region of the suction section or of the sealing section, between these sections or outside the named sections in the radial direction—can have at least one suction opening in order to achieve a contact of the product at the contact surface that is as firm as possible and preferably tight.

In accordance with a further embodiment, a plurality of first suction sections and/or a plurality of sealing sections—possibly with one second suction section or a plurality of second suction sections respectively—are provided, with the suction sections and/or sealing sections in particular being asymmetrically shaped and/or distributed in a plan view of the suction device. They are, for example, separated from one another by only one sealing device in each case. Additionally or alternatively, it is, however, by all means conceivable to also provide a spatial spacing apart of the named sections.

It is advantageous in a number of cases to shape and/or distribute the suction sections asymmetrically in a plan view of the suction device (viewed from the product to be gripped). It can thereby be taken into account that transverse forces of different magnitudes which have to be compensated can act on the product from different sides. For example, considerable transverse forces occur in the case of a product to be cut when the cutting blade penetrates into the product. More suction and/or sealing sections and/or particularly shaped suction and/or sealing sections can therefore be provided at the side of the gripper which faces the inlet side of the cutting blade in order to be able to provide larger holding forces here as required. In another respect, this also applies to other means for fixing the product to the gripper (e.g. cooling device, see above, and/or mechanical gripping apparatus engaging into the product, see below).

Having regard to specific products and/or particularly high demands on the holding forces to be applied, the gripper can comprise a selectively actuable gripping apparatus which has at least one gripping element which is arranged such that it can penetrate into the product in the region of the contact surface and/or in a region around the contact surface on a contact of the gripper with the product. A corresponding actuation apparatus can be mechanically, pneumatically, hydraulically or electrically operable.

The gripping element is in particular arranged such that it can engage into the product in the region of the first suction section on a contact of the gripper with the product. A further embodiment of the gripping element provides that it is arranged such that it can engage into a marginal region of the product on a contact of the gripper with the product. The engagement can in particular be provided in a direction oblique to the margin of the product. If particularly large transverse forces act on the product from this margin of the product—for example on a penetration of a cutting blade—said product is pressed toward the gripping element. This has an assistive effect on the fixing.

In accordance with an embodiment of the pumping device, it comprises a plurality of separate pumping units. This is in particular of advantage when a plurality of suction sections are present which should have a vacuum applied individually and as required. In this respect, it is for example by all means possible to couple some suction sections to a pumping unit and to connect other suction sections to a different unit. A separate application of a vacuum can also be produced by suitable means for setting the desired vacuum levels in the individual sections of the suction device. Such means are, for example, valve devices or restrictor devices. A combination of a plurality of pumping units and means for setting the pressure is likewise possible.

The pumping device is in particular configured such that it allows a vacuum generation which is variable in time. Depending on requirements, the respective required suction power is then provided. The configuration of the pumping device in particular allows the provision of different vacuum levels in different sections of the suction device, which was already mentioned above.

In accordance with a further embodiment, the first suction section and the sealing section are separate units. Separate sections, i.e. units are in particular arranged such that they are actively and/or passively movable relative to one another. If a plurality of suction sections/sealing sections are present, they can be grouped to form separate units as desired.

The present invention furthermore relates to a cutting apparatus for cutting a product, in particular a food product. The cutting apparatus comprises a feeding apparatus—for example a transport belt—for feeding the product in a direction substantially perpendicular to a cutting plane defined by a cutting blade and by a cutting edge; and a gripper in accordance with at least one of the embodiments described above. The gripper in particular has at least one fixing means, in addition to the suction device, at a side which faces a cutting blade inlet side of the product in order to additionally fix the product at this side. As has already been described a multiple of times above, particularly large transverse forces occur at this side of the product when the cutting blade penetrates into the product. The additional fixing means takes this into account. Suitable fixing means are, for example, corresponding suction sections, gripping apparatus mechanically engaging into the product, cooling devices effecting an icing over or the like.

The present invention also sets itself the object of providing an improved method for cutting a product in which smaller product end sections which can no longer be cut are produced.

In the method, a cutting apparatus, in particular as discussed in the foregoing, is used which comprises a product receiver for receiving the product; a feeding apparatus for feeding the product in a direction substantially perpendicular to a cutting plane defined by a cutting blade and by a cutting edge; and a gripper having a suction device for gripping an end section of the product. A cutting apparatus of the above-described kind and/or a gripper in accordance with any one of the embodiments described above is/are in particular used in the method.

In accordance with the invention, a vacuum which is variable in time and/or which differs locally is generated by the suction device. This means a suction power which is variable in time as required and/or which is spatially adapted is provided by the suction device.

The suction device in particular has a plurality of separate suction sections in which a respective adapted vacuum is produced independently of one another, with at least one suction section arranged in a central region of the suction device in particular having a larger vacuum applied at least at times than at least one suction section which is disposed outside the central region viewed in the radial direction. Two or more suction sections can also be coupled to one another in a technically pressurized manner. Suction sections which do not communicate with one another bring about the advantage that leaks in the region of a suction section do not have a disadvantageous influence on the fixing effect of the suction section or of the other suction sections. In other words: If secondary air is drawn in a suction section—for example due to particularly large pores in the product and/or due to an insufficient sealing—this does not impair the suction effects of the other suction sections.

In accordance with an embodiment of the method, a suction section arranged in a central region of the suction device (or a plurality of suction sections arranged there) has a larger vacuum applied at least at times than a suction section or a plurality of suction sections which is/are arranged outside the central region viewed in the radial direction. This is advantageous because a product surface which is comparatively well suited for the coupling, for example a substantially planar surface, is to be expected in the central region.

At least one suction section which is arranged at a side of the gripper facing a cutting blade inlet side of the product in particular has a larger vacuum applied at least at times—in particular in an end phase of the cutting process—than a suction section (or suction sections) arranged at a side of the gripper remote from the cutting blade inlet side of the product. The transverse forces which are particularly large here on the cutting are thereby "picked up". This is in particular of great importance in an end phase of the cutting process since the product fixing by the feeding device (often a transport belt) is limited due to the small contact surface of the product.

In accordance with a further embodiment of the method, a first suction power is provided at the start of a gripping process for gripping the product in order to securely grip the product. A second suction power which is smaller than the first suction power is provided during the adjoining cutting process of the product. In other words, a pronounced sucking in of the product is initially effected to ensure a reliable fixing. The suction power is reduced during the slicing of the product which is still reliably fixed at the feeding device. This in particular takes place to save energy, but also in order not to put too large a load on an elastic product, for example, through excessive suction forces such that the holding force then possibly lessens in the end phase of the cutting process. The suction power can be increased again toward the product end, i.e. in an end phase of the cutting process, in order to compensate the decreasing fixing by the feeding apparatus. This makes it possible to also still be able to cut an end section of the product in a reliably precise manner. The regulation of the respective required vacuum or of the corresponding suction power can take place continuously or in discrete steps.

To increase the process reliability, the suction power and/or a vacuum present in the suction device can be monitored in order to detect leakage flows through the product and/or through a sealing device of the suction device wherein at least one of the suction power and a vacuum present in the suction device is monitored in order to detect leakage flows through the product and/or through a sealing device of the suction device, in particular with the suction power being adapted—preferably being adapted locally—in response to the recognition of leakage flows. The suction power can be adapted—preferably adapted locally—in response to a recognition of leakage flows. The above-described monitoring in particular makes it possible to compensate locally occurring leaks in a design of the suction device comprising a plurality of suction sections, i.e. to increase the suction power in suction sections affected by a leak and/or to increase the suction power in the other suction sections. If it is recognized that an increase in the suction power in a suction section affected by a leak does not bring about an improvement of the situation, the suction power can also be reduced to zero there in order to save energy. This should only take place when it is ensured that the product can nevertheless still be held reliably. Otherwise, a warning can also be output and/or a safety switch-off can even take place.

To improve the fixing of the product to the gripper, a cooling device can be provided by which the gripper—in particular in the region of the suction device and/or in an adjacent region—is cooled at least sectionally in order to produce an icing over between the product and the gripper. For this purpose, a coolant and/or water can be introduced into a suction space of the suction device. The coolant and the water are in particular introduced after one another into the suction space of the suction device. A possible procedure provides first flooding the suction space or the suction device once or a multiple of times with a coolant and subsequently introducing water which then freezes very fast due to the precooling. The procedure can also be reversed if required. An evacuation of the suction space in connection with an introduction of water (in any desired order or simultaneously) assists its distribution and icing over.

An improved fixing of the product is also achieved by a selectively actuable gripping apparatus which is brought into mechanical engagement with the end section of the product.

In order to compensate vibrations occurring in the cutting process, the gripper can be arranged laterally movable in a plane of the contact surface. The movability of the gripper can be varied in time. This means the lateral movability of the gripper can be adapted to the respective present conditions. It can also be suppressed completely if this is required. The gripper advantageously comprises sections which are movable separately from one another, with the movability of the sections in particular being varied independently of one another.

The respective characteristics of the different embodiments of the gripper in accordance with the invention can be combined with one another as required in order to provide a gripper which is suitable for the respective present demands profile which is substantially determined by product and machine parameters. The same accordingly applies to the method in accordance with the invention for cutting a product.

Further embodiments of the present invention are set forth in the claims, in the description and in the enclosed drawings.

The invention will be described in the following purely by way of example with reference to advantageous embodiments and to the drawings. There are shown:

FIG. 14 an eleventh embodiment of the gripper in accordance with the

Figure 1:
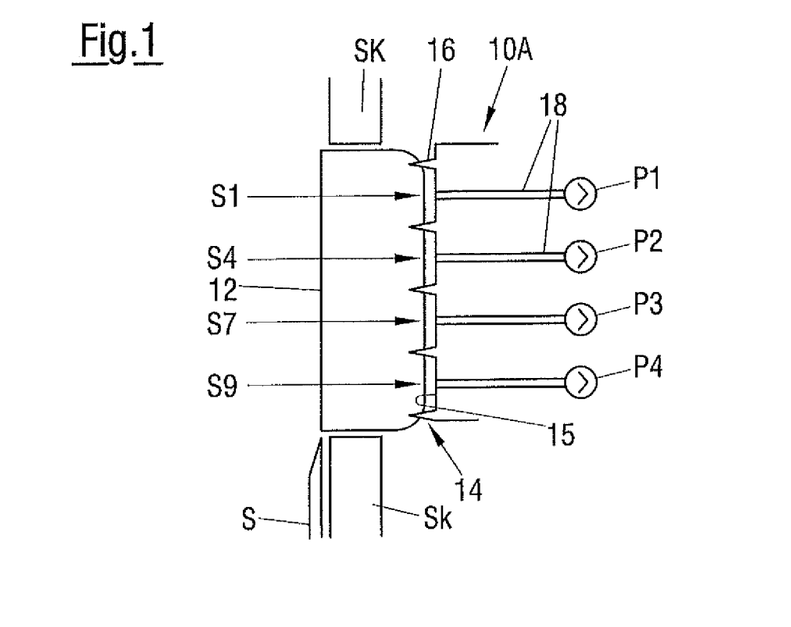
FIG. 1 a first embodiment of the gripper in accordance with the invention in a sectional view.

FIG. 1 shows a gripper 10A in a sectional view. It is in engagement with an end section of a food product 12, for example a bar-shaped cheese. The product 12 is sliced into slices by a cutting blade S in the region of a cutting edge SK.

The gripper 10A is indeed also already coupled to the end section of the product 12 at the start of the cutting process when the product 12 still lies over a large area on a transport belt, not shown. The fixing effect of the gripper 10A, however, does not yet play such a large role in this respect as in an end phase of the cutting process. The contact surface of the product 12 on the transport belt is namely very small then and the transverse forces generated on the penetration of the cutting blade S into the product 12 have to be taken up by the gripper 10A in order to also allow a precise cutting of the end section of the product 12.

To securely grip the product 12 without a deep mechanical engagement into the product 12 taking place in the process, the gripper 10A has a suction device 14 which fixes the product 12 to the gripper 10A by means of a vacuum.

Figure 2:
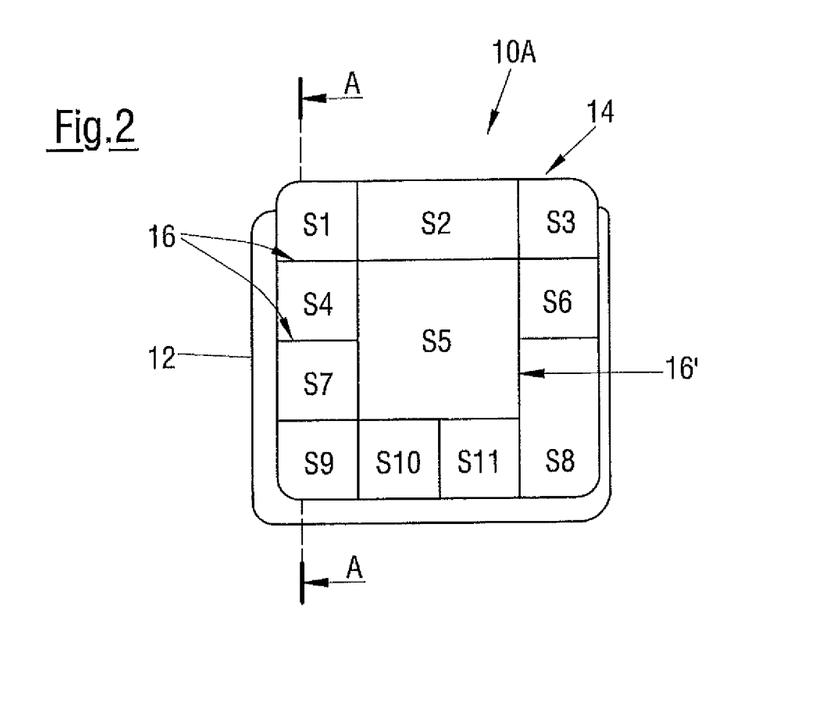
FIG. 2 the first embodiment of the gripper in a front view.

A front view of the suction device 14 (viewed from the product 12) can be seen in FIG. 2. The cutting plane A-A of FIG. 1 is also indicated in FIG. 2. The suction device 14 comprises a plurality of separate suction sections S1 to S11. They are separated from one another by corresponding sealing devices. This means a desired vacuum can be generated in every suction section S1 to S11 independently of the other suction sections when the gripper 10A contacts the rear side of the product 12. For example, the suction power provided to the suction sections S1 to S11 is monitored and regulated as required. A pressure monitoring in the region of the individual suction sections S1 to S11 is also conceivable.

Holding forces which differ locally can be produced as required by an individual application of a vacuum to the suction sections S1 to S11. If one of the suction sections S1 to S11 has leaks, a larger suction power can be supplied to it and/or other suction sections S1 to S11 compensate the loss of holding force through an increased allocation of suction power. In other words, a division of the suction arrangement into a plurality of suction sections S1 to S11 allows a higher flexibility in order to be able to respond to the respective present conditions.

In the present example, base sections of the suction sections S1 to S11 simultaneously form a contact surface 15 for the product 12. This means the product 12 is pressed toward the contact surface 15 when the suction sections S1 to S11 are supplied with a vacuum. However, provision can be made that recesses forming respective suction spaces are provided in the suction sections S1 to S11.

As can be seen in FIG. 1, the sealing devices are blade edges 16 which penetrate into the product 12 and thus form a seal extending in the radial direction of the respective section S1 to S11. In the present example, the suction section S5 forms a central region of the suction device 14. The suction section S5 is surrounded by the suction sections S1 to S4 and S6 to S11. A symmetrical or uniform suction section configuration can also be provided instead of the shown irregular design and distribution of the suction sections surrounding the central suction section S5.

The suction sections S1 to S4 and S6 to S11 form a ring around the central suction section S5 and thus additionally shield it with respect to the environment.

Finally, they act like an additional barrier for the "protection" of the suction section S5 and of the fixing effect generated by it. Even if problems arise on the generation of a vacuum in one or more of the suction sections S1 to S4 and S6 to S11, this does not mean that it has a negative influence on the suction section S5 or on the other suction sections forming the protective margin. The division of the side of the suction device 14 facing the product 12 can be adapted to the respective demands. A plurality of separate sections are preferably in particular arranged in regions which are under a particular load. Provision can be made in the present example that the cutting blade S penetrates into the product 12 from the left in FIG. 2 (differing from the situation indicated in FIG. 1) during the cutting process. Four suction sections S1, S4, S7 and S9 are namely provided there. The transverse forces associated with the cutting can be taken up by these suction sections S1, S4, S7 and S9.

In the gripper 10A, adjacent suction sections S1 to S11 sectionally "share" their sealing device. The blade edge 16' surrounding the suction section S5 simultaneously forms a respective section, inwardly disposed in the radial direction, of the sealing device of the suction sections surrounding the suction section S5. Provision can naturally also be made that some of the suction sections S1 to S11 or each suction section S1 to S11 has its/their "own" sealing device, i.e.

an intermediate space can be provided between the sealing devices of adjacent suction sections S1 to S11 and is possibly (partly) filled by a product 12 on a contact of said product.

The vacuum in the suction sections S1 to S11 is generated by suitable pumping devices P1 to P4 (see FIG. 1). The devices P1 to P4 are connected via suction channels 18 to the suction sections S1, S4, S7 and S9 arranged between the blade edges 16. A plurality of suction sections can generally, however, also be connected to a common pumping device, which will be explained in more detail in the following.

Figure 3:
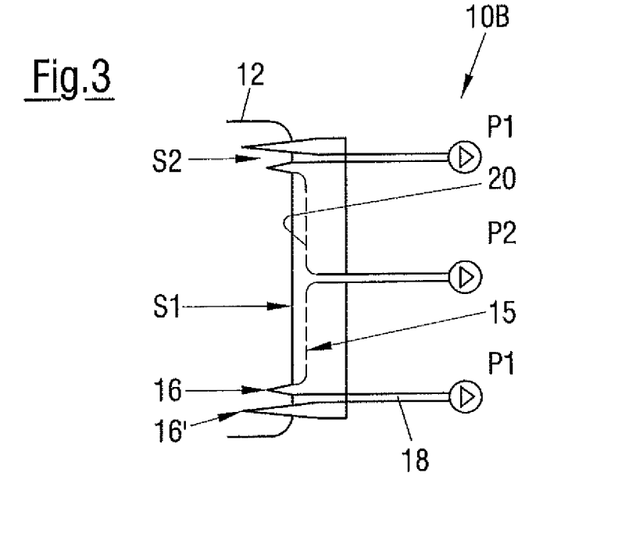
FIG. 3 a second embodiment of the gripper in accordance with the invention in a sectional view.

FIG. 3 shows a gripper 10B which has a central suction section Si. The suction section S1 comprises a suction space 20 which is in communication with the pumping device P2 via the suction channel 18. The suction space 20 is surrounded by a ring-shaped contact surface 15 in the radial direction. A blade edge 16 closed in the radial direction is arranged radially outside the contact surface 15, penetrates into the product 12 on a gripping of said product and thus seals the suction section S1. The suction section S1 is in turn surrounded by a suction section S2 which is delineated toward the outside with respect to the environment by a blade edge 16'. The blade edge 16' engages more deeply into the product 12 than the blade edge 16. The suction section S2 is in communication with a pumping device P1. It is generally also possible to divide the suction section S2 into a plurality of segments which are in communication with different pumping devices. The suction section S2 forms a barrier which surrounds the suction section S1 and which can have a vacuum applied independently of the suction section S1, which has a positive influence on the gripping effect of the gripper 10B.

Figure 4:
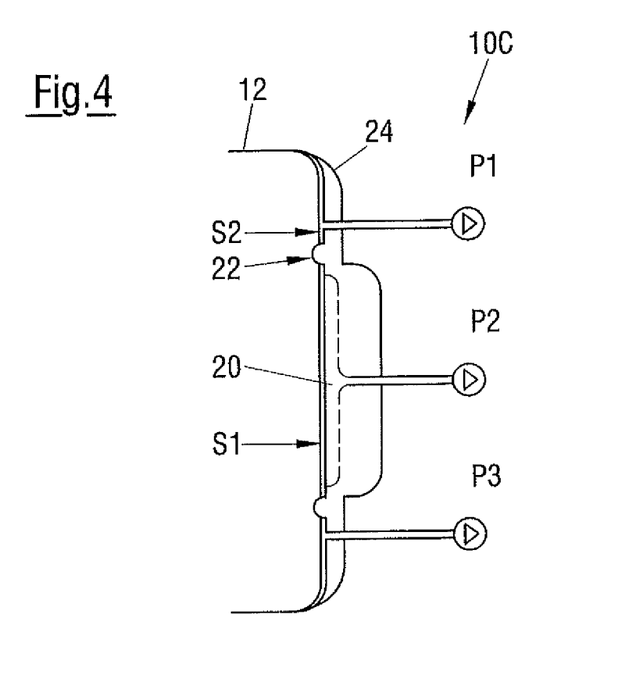
FIG. 4 a third embodiment of the gripper in accordance with the invention in a sectional view.

FIG. 4 shows a gripper 10C which, just as the gripper 10B, comprises a first suction section S1 and a second suction section S2. However, no blade edges 16,16' are provided here to sealingly separate the suction sections S1, S2 from one another. For this purpose, a bead 22 surrounding the suction section S1 in the radial direction is provided which is fixedly pressed toward the product 12 by the vacuum present in the suction space 20 on the operation of the pumping device P2 and which even elastically deforms said product under certain circumstances. The suction section S2, which is segmented in the present example and has a vacuum applied by two separate pumping devices P1 and P3, has an elastic sealing lip 24 which lies on the product 12. The sealing lip 24 is sucked toward the product 12 by the vacuum provided in the suction section S2 such that product irregularities are also compensated.

Figures 5, 6:
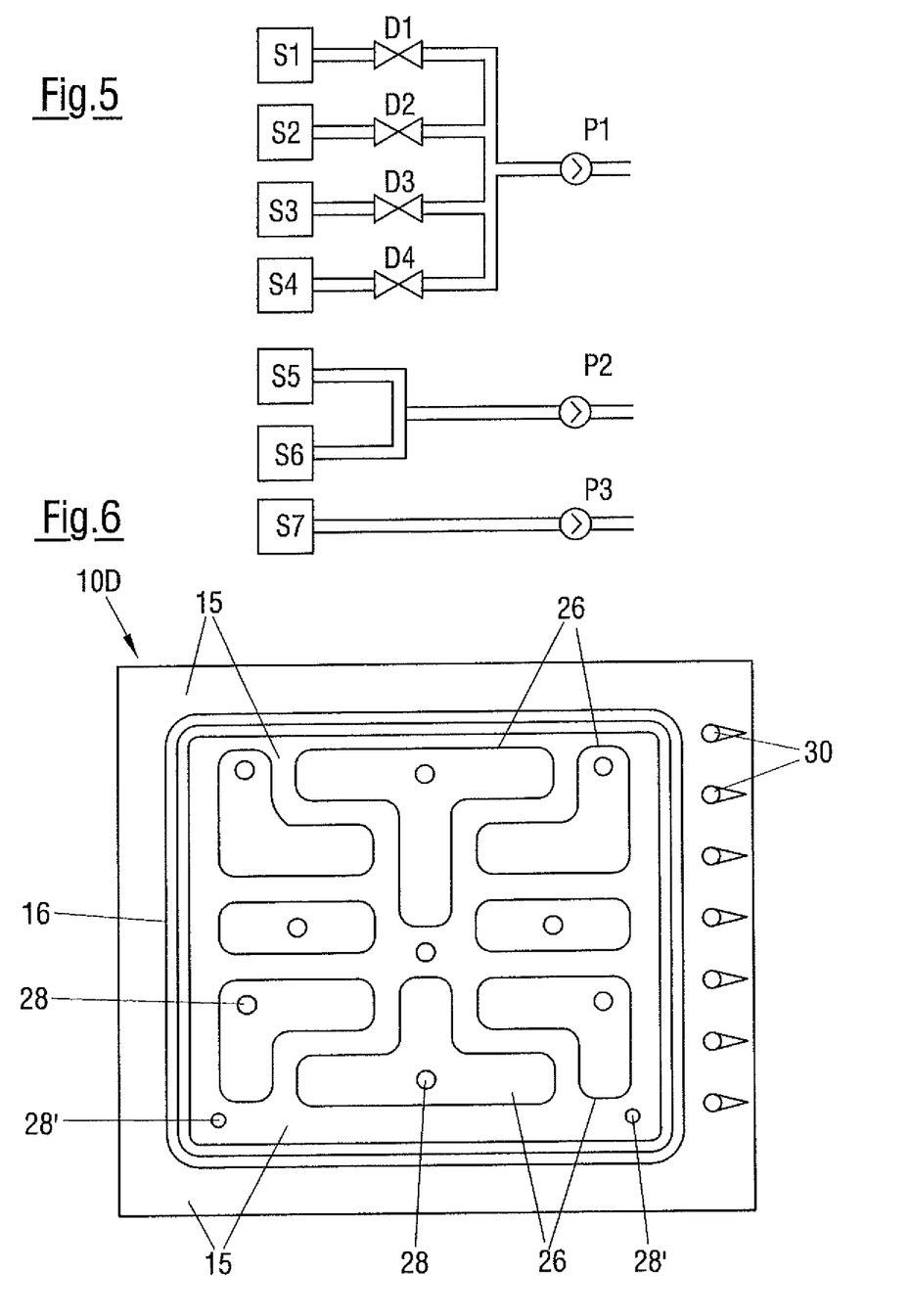
FIG. 5 an embodiment of the pumping device.
FIG. 6 a fourth embodiment of the gripper in accordance with the invention in a front view.

FIG. 5 illustrates that the supply of a vacuum to individual sections of the suction device 14 is flexibly adaptable to the respective present demands (here shown by way of example with reference to seven sections S1 to S7). It is naturally generally possible to associate a separate pumping device P with each section S1 to S7 (see section S7, pumping device P3). However, it is favorable in a number of cases to couple a plurality of sections to a pumping device (see pumping device P2 which is coupled to the sections S5 and S6). Means for generating the desired vacuum level can also be provided, for example valve devices or restrictor devices. The sections S1 to S4 are connected to a common pumping device P1 via restrictors D1 to D4 in FIG. 5. The restrictors D1 to D4 can be configured such that a specific vacuum level is produced in each of the sections S1 to S4. Valve devices (which can be controlled) can be provided instead of—or in addition to—the restrictors D1 to D4 in order to ensure a suitable supply of a vacuum to the sections S1 to S4. Any desired other combinations of pumping devices and/or means for setting the desired vacuum levels can be implemented as desired.

FIG. 6 shows a front view of a further gripper 10D (viewed from the product 12). Said further gripper has a contact surface 15 which is provided with a sealing device closed in the radial direction, for example with a blade edge 16. A series of irregularly shaped recesses 26 whose base sections each have at least one suction opening 28 are arranged in the contact surface 15. The suction openings 28 are in communication with one or more pumping devices. The recesses 26 therefore each form a suction section. The suction sections formed in this manner are separated by wall sections whose surfaces facing the product 12 are a part of the contact surface 15. The contacting product 12 thus seals the recesses 26 with respect to one another in the region of the contact surface 15.

To further improve the connection between the gripper 10D and the product 12, suction openings 28' are also provided in the contact surface 15 at suitable points (also radially outside the blade edge 16 if required).

The product 12 is not only sucked into the recesses 26, but is also (partly) sucked into the mentioned openings 28, 28' by the vacuum applied to the suction openings 28, 28'.

Slanted tips 30 which engage mechanically into the product 12 on a contact of the gripper 10D with said product are an additional measure for improving the gripping effect of the gripper 10D. The tips 30 are preferably arranged at the side of the gripper 10D from which a cutting blade penetrates into the product 12. The transverse forces arising in this respect additionally press the product 12 into the slanted tips 30.

Figure 7:
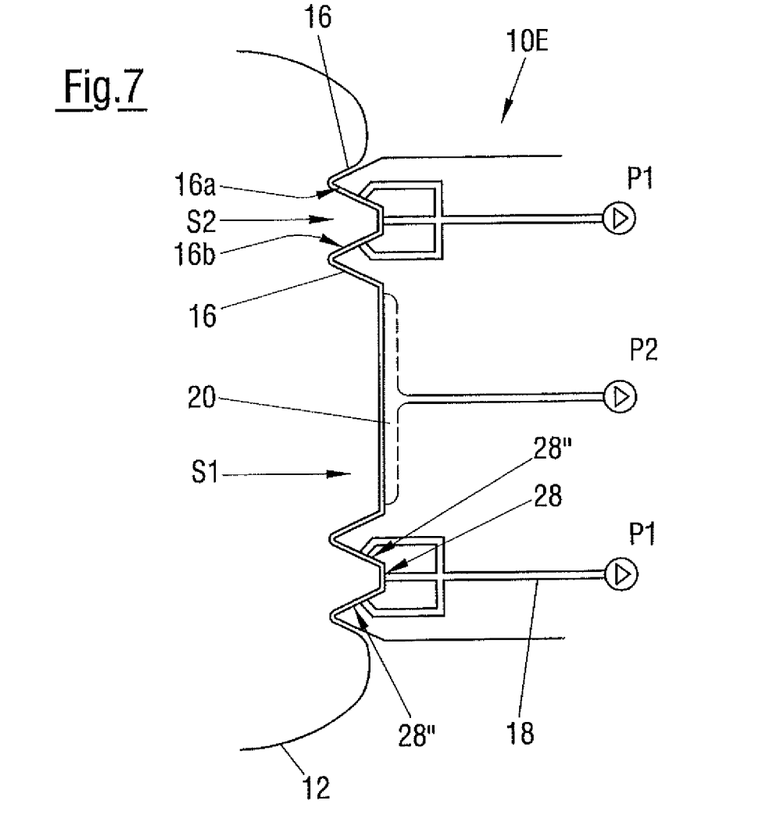
FIG. 7 a fifth embodiment of the gripper in accordance with the invention in a sectional view.

FIG. 7 shows a gripper 10E which has a similar design to the gripper 10B. However, instead of the blade edges 16, 16' of different sizes, blade edges 16 shaped in approximately the same manner are provided. The slopes of the blade edges 16 of the gripper 10E are arranged less steeply than those of the blade edges 16, 16' of the gripper 10B. A more pronounced local compression of the product 12 is thereby effected, whereby pores in the product 12 are closed which can lead to unwanted leakage flows of air through the product 12. Such leakage flows which can also occur in unreliably sealed sealing devices put a load on the pumping device(s) of the gripper and/or lead to an inferior fixing of the product.

The compressive effect is additionally reinforced in that an inwardly disposed flank 16a of the outer blade edge 16 and an outwardly disposed flank 16b of the inner blade edge 16 converge in a direction toward a base section of the suction section S2. In figurative terms, the product 12 is sucked into a cone, whereby it is compacted.

The flanks 16a, 16b are additionally provided with suction openings 28" in order to not only compress the product 12 locally, but also to suck it toward the flanks 16a, 16b and to further improve the sealing effect of the blade edges 16 in this manner.

Figure 8:
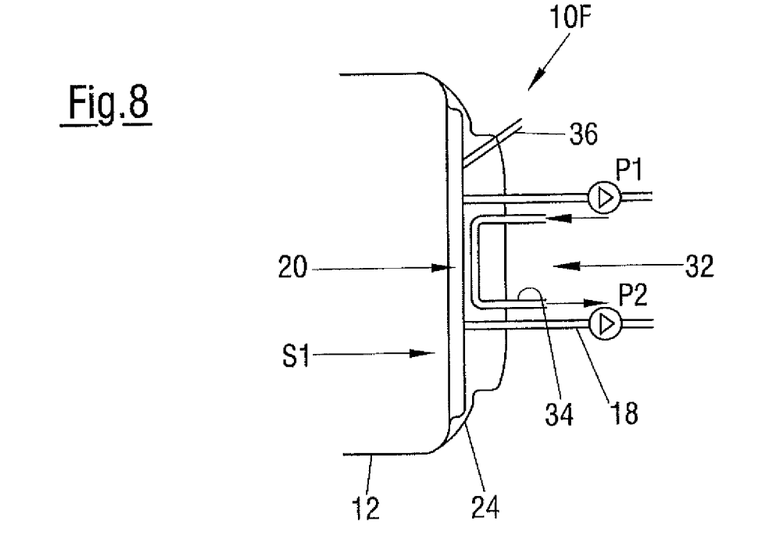
FIG. 8 a sixth embodiment of the gripper in accordance with the invention in a sectional view.

FIG. 8 shows a gripper 10F having a suction section S1 whose suction space 20 is sealed in the radial direction with respect to the environment by a sealing lip 24 tightly contacting the product 12. The suction space 20 can be evacuated by pumping devices P1, P2. A cooling device 32 is furthermore provided by which the gripper 10F can be cooled sectionally. The cooling device 32 has at least one coolant passage 34 through which a suitable coolant—for example liquid nitrogen, brine, undercooled compressed air—can be conducted. A local icing over of the product 12 with the gripper 10F can thereby be effected and assists the fixing of the product 12 (in particular at a cutting blade inlet side of the product 12). Water possibly contained in the product 12 is at least partly sucked out of the product 12 by the vacuum in the suction space 20 and is available for an icing over by which the product 12 and the gripper 10F are additionally coupled to one another. Alternatively or additionally, the injection of water into the suction space 20 can, however, also be provided. The gripper 10F has an injection opening 36 for this purpose. A coolant can, however, also be introduced into the suction space 20 through the injection opening 36 in order to cool said suction space. For example, cold nitrogen is first blown into the suction space 20 in order to precool it and the product 12. Water is subsequently introduced through the injection opening 36 and a vacuum is simultaneously generated in the suction space 20. The vacuum inter alia ensures an improved distribution of the water in the suction space 20 and the water freezes quickly due to the precooling. The icing over generated in such a manner is maintained by the cooling device 32. It is understood that the most varied variations of the procedure for generating an icing over (for example different coolant-water injection cycles) are conceivable in dependence on the properties of the product 12 to be held and due to other demands.

Figure 9:
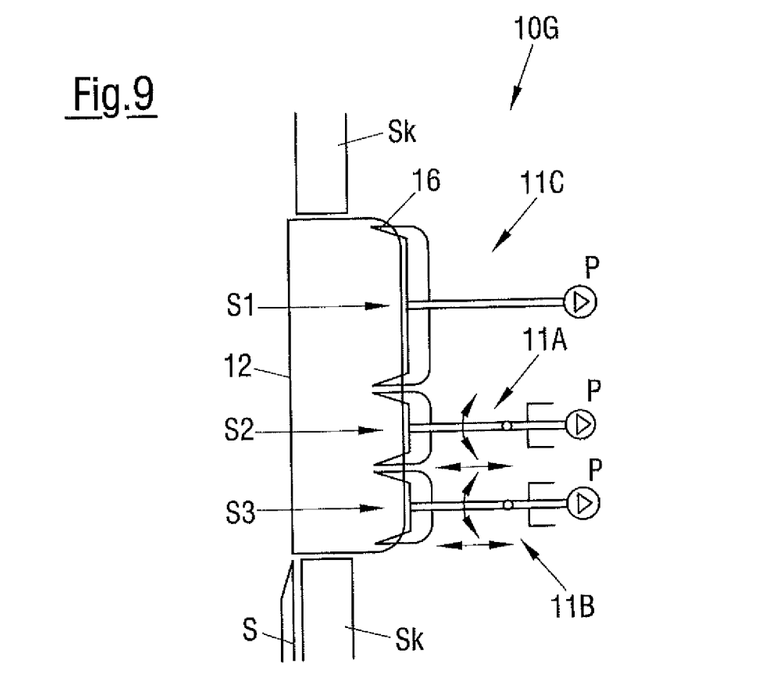
FIG. 9 a seventh embodiment of the gripper in accordance with the invention in a sectional view.

FIG. 9 shows a gripper 10G having three suction sections S1, S2, S3 which are each bounded in the radial direction by a blade edge 16. The suction sections S2 and S3 are associated with the gripper sections 11A, 11B which are arranged such that they are laterally movable. A certain axial movability is also alternatively or additionally permitted by corresponding devices. The movability of the gripper sections 11A, 11B compensates vibrations which are triggered by an entry of the cutting blade S into the product 12. It is thereby avoided that leaks occur in the region of the suction sections S2, S3. The gripper section 110 is, in contrast, substantially fixedly arranged at least with respect to lateral movements (a feeding of the product 12 should naturally still be possible).

The lateral movability of the sections 11A, 11B can, for example, be provided by articulated and/or elastic components. The movability of the sections 11A, 11B can preferably be changed directly in order to be able to produce respective adapted gripper properties in the different phases of the gripping and of the cutting of the product 12.

Figure 10:
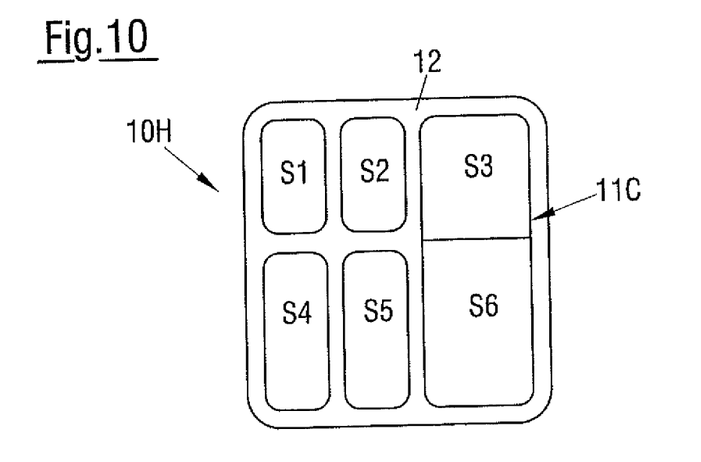
FIG. 10 an eighth embodiment of the gripper in accordance with the invention in a front view.

FIG. 10 shows a gripper 10H having a plurality of suction sections S1 to S6 in a front view, wherein the suction sections S3 to S7 are arranged at a common gripper section 110 which, like the gripper section 110 of the gripper 10G, is substantially insensitive with respect to lateral movements. The gripper sections 11A, 11B associated with the suction sections S1, S2, S4, S5 allow lateral movements. The example shown should demonstrate that different suction sections can be combined as desired to form groups which have different properties with respect to a lateral movability.

Figure 11:
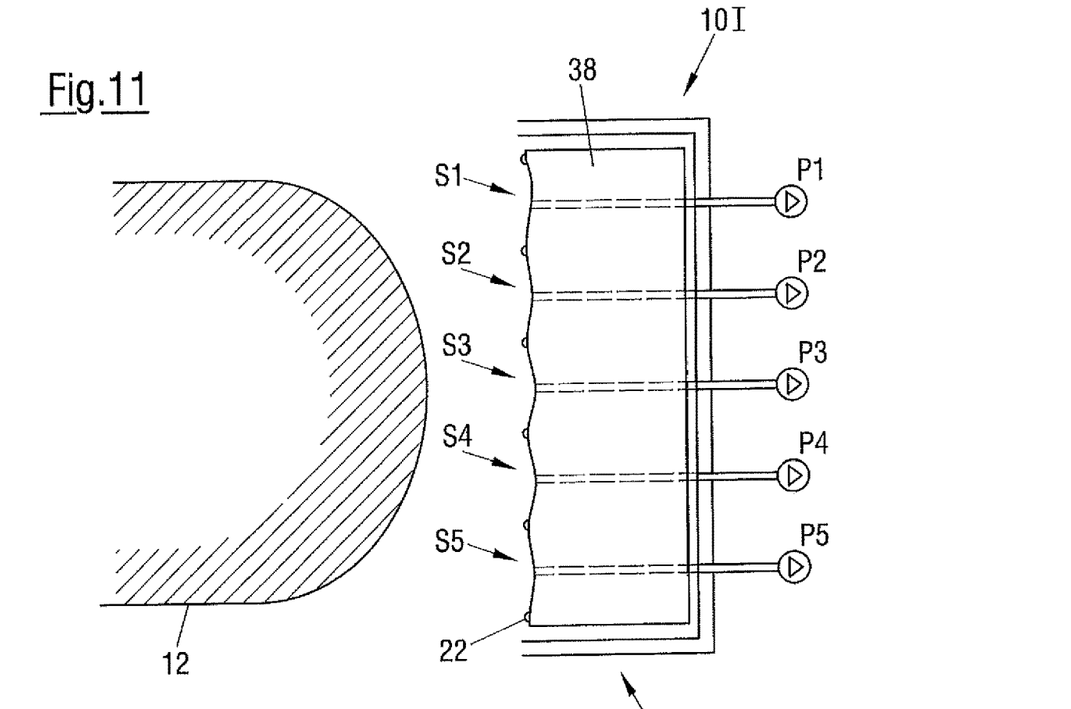
FIGS. 11 and 12 a ninth embodiment of the gripper in accordance with the invention in a sectional view in different states.
Figure 12:
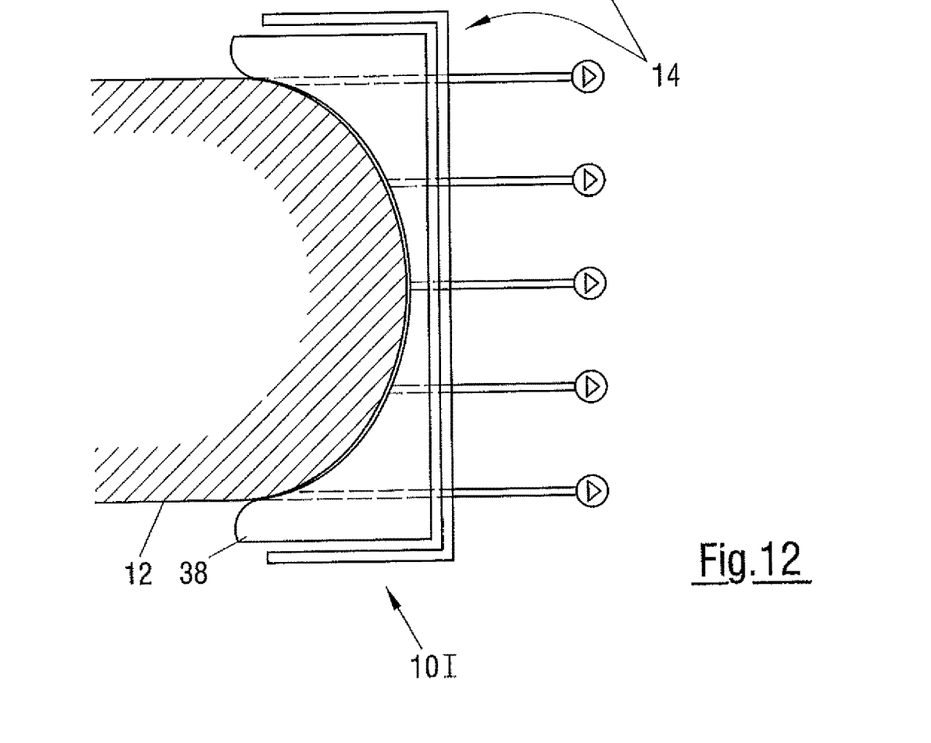

FIGS. 11 and 12 show a gripper 10I which has a suction device 14 which can be adapted to the surface geometry of the product 12. The suction device 14 has a deformable element 38 whose side facing the product 12 is divided by beads 22 into a plurality of suction sections S1 to S5 (naturally other sealing devices can also be used). The suction sections S1 to S5 are in turn connected to suitable pumping devices P1 to P5 (it is understood that separate pumping devices do not necessarily have to be provided; cf. in particular the statements on FIG. 5).

The suction device 14 is pressed toward the product 12 to grip the product 12, wherein the deformable element 38 is adapted to the geometry of the product 12 (see FIG. 12). In this respect, said deformable element lies at the surface of the product, whereby a good sealing of the suction sections S1 to S5 is achieved. The deformable element 38 can be elastic. It is, however, also possible to ensure a fixing of the shape of the suction device 14 by a suitable integration of electrorheological or magnetorheological components. The deformable element 38 can, for example, also include a liquid which changes its aggregate state through a suitable cooling, whereby the shape obtained by the pressing on is fixed. Differing from the embodiment shown, the deformable element 38 can, for example, also only be provided in a marginal region of the suction device 14 in order to allow an at least sectional adaptation of the surface facing the product 12.

Figure 13:
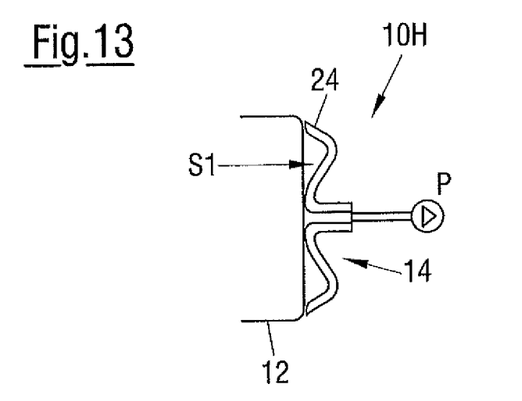
FIG. 13 a tenth embodiment of the gripper in accordance with the invention in a sectional view.

FIG. 13 shows a gripper 10H having a suction device 14 whose outer margin is provided with a sealing lip 24 to define a suction space S1. The suction device 14 can be designed at least partly as elastic to be able to nestle at the surface of the product 12.

Figure 14:
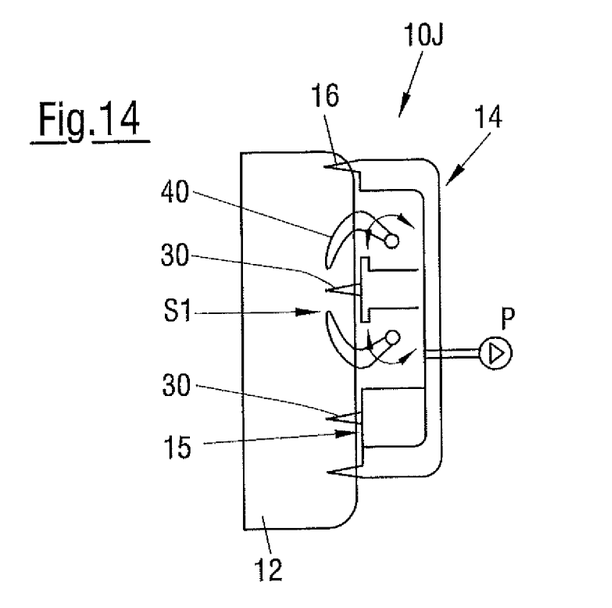

FIG. 14 shows a gripper 10J having a suction device 14 which has a suction section S1. The contact surface 15 of the suction device 14 contacts the product 12. The contact surface 15 is provided with tips 30 to improve the fixing of the product 12. The suction section 16 is bounded in the radial direction by a blade edge 16. It can be advantageous in specific cases to provide mechanical fixing means in addition to the fixing effect which is provided by the suction device 14. In the present example, they are selectively pivotable claws 40. They engage into the product 12 in the region of the suction section S1.

Figure 15:
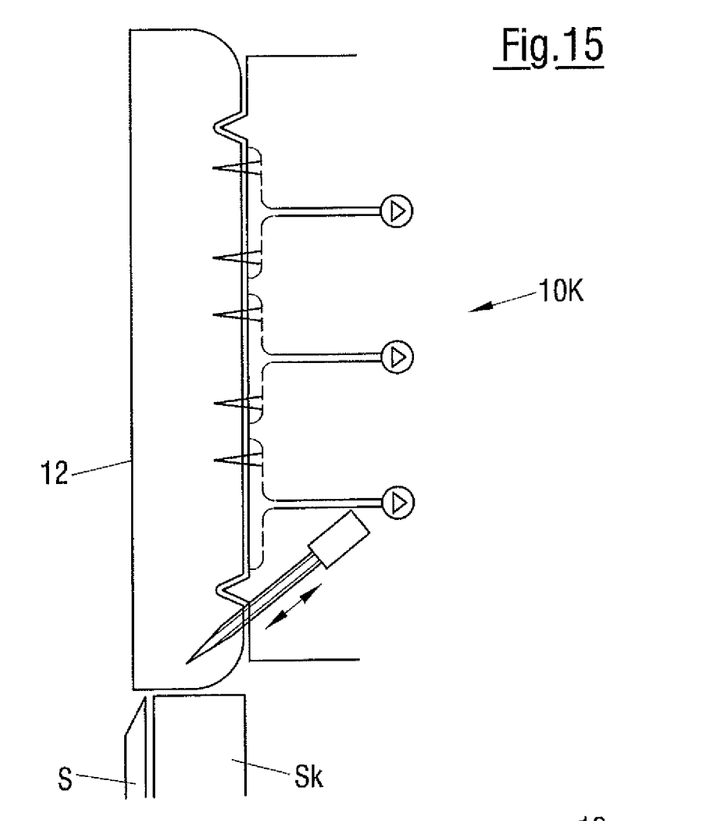
FIG. 15 a twelfth embodiment of the gripper in accordance with the invention in a sectional view.

FIG. 15 shows a gripper 10K which has a hook 42 at its side facing the cutting blade S, said hook being able to be obliquely introduced into the product 12. The product 12 is pressed into the hook 42 by the transverse forces arising on the cutting which have already been discussed a multiple of times above, whereby the fixing of the product 12 to the gripper 10K is improved. The hook 42 can also be configured as a tip or as a spike. A plurality of such elements 42 are in particular provided and are, for example, arranged in a row (such as, for instance, the tips 30 in FIG. 6).

Figure 16:
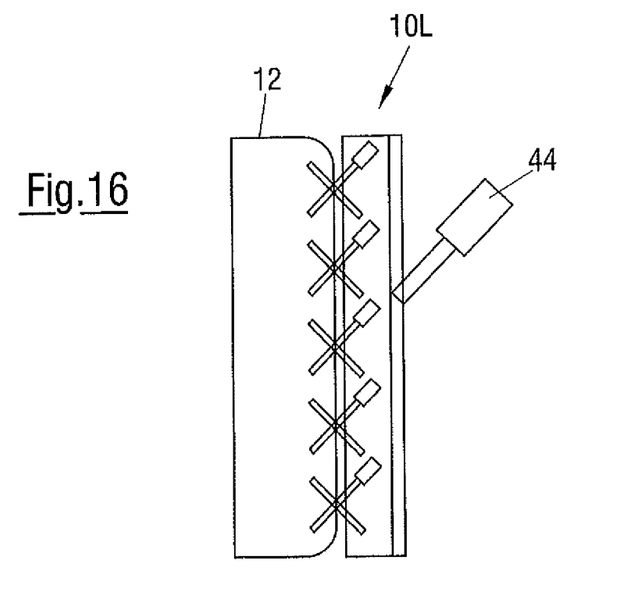
FIG. 16 a thirteenth embodiment of the gripper in accordance with the invention in a sectional view.

FIG. 16 shows a gripper 10L which has a plurality of elements 42 which alternately engage obliquely into the product 12 to achieve a particularly good fixing of the product 12. A pneumatic cylinder 44 can, for example, be provided to actuate the elements 42. Alternative activation mechanisms (electric, hydraulic, mechanical . . . ) are likewise conceivable.

The above-described construction or technical process measures for improving the sealing of the suction device 14 can be combined as desired to provide the gripper suitable for the respective present demand or to provide an optimized gripping/cutting process. It is thus by all means possible to combine the concept of a plurality of independent suction sections with additional fixing measures (elements to be brought into mechanical engagement with the product, (local) icing over, etc.). A laterally movable arrangement of the gripper or of individual sections of the gripper can likewise easily be integrated into the described embodiments. Particular attention is in this respect directed to the cutting blade inlet side of the product to be cut since the largest transverse forces arise here.

In the embodiment of the gripper in accordance with the invention, value is in particular placed on a hygienically suitable design and a good cleanability. Parts of the gripper, in particular the suction device or its components, are designed as easily releasable. This facilitates an optical check of the essential assembly groups of the gripper, above all at the suction side.

REFERENCE NUMERAL LIST

10A to 10L gripper
12 product
14 suction device
15 contact surface
16,16' blade edge
16a,16b blade edge flank
18 suction channel
20 suction space
22 bead
24 sealing lip
26 recess
28,28',28" suction opening
30 tip
32 cooling device
34 coolant passage
36 injection opening
38 deformable element
40 claw
42 hook
44 pneumatic cylinder
S1 to S11 suction section
SK cutting edge
S cutting blade
A-A cutting plane
P1 to P4 pumping device
D1 to D4 restrictor

The invention claimed is:

1. A slicing machine for slicing a food product into slices, the slicing machine comprising: a rotating blade cooperating with a cutting edge at a termination of a supply region; a gripper for gripping the food product, the gripper being part of the supply region and having a suction device which has a contact surface which can be brought into contact with a section of the product, wherein the suction device comprises a suction section which is bounded in the radial direction by a sealing device and which is in communication with a pumping device generating a vacuum, the sealing device comprising a blade edge that cuts into the food product; wherein the suction section is divided into at least two segments by at least one wall section, each of the at least two segments comprising a recess from the contact surface; at least one suction opening on the contact surface and at least one suction opening within the recess; and wherein a surface of the wall section facing the product forms a part of the contact surface, the contact surface being substantially perpendicular to a rotational axis of the rotating blade.

2. The gripper in accordance with claim 1, wherein the shape of the first suction section is at least sectionally adaptable to a shape of the surface of the section of the product.

3. The gripper in accordance with claim 1,
further comprising a sealing section, wherein the sealing section comprises at least one second suction section which is bounded in the radial direction by a second sealing device and which is in communication with the pumping device generating the vacuum.

4. The gripper in accordance with claim 3,
wherein at least one of the first sealing device and the second sealing device is at least sectionally designed as at least one of a blade edge, a bead and a sealing lip.

5. The gripper in accordance with claim 3,
wherein the suction openings are in communication with the pumping device.

6. The gripper in accordance with claim 3,
wherein at least one of the first sealing device and the second sealing device is shaped such that a local compression of the product which can be brought into contact with the sealing device can be produced.

7. The gripper in accordance with claim 3, wherein a plurality of first suction sections or a plurality of sealing sections are provided.

8. The gripper in accordance with claim 3, wherein the first suction section and the sealing section are separate units.

9. The gripper in accordance with claim 1, wherein the pumping device comprises a plurality of separate pumping units and wherein a means for setting predefinable vacuum levels in the sections of the suction device is provided.

10. A slicing machine for slicing a food product into slices, the slicing machine comprising: a rotating blade cooperating with a cutting edge at a termination of a supply region; a gripper for gripping the food product, the gripper being part of the supply region and having a suction device which has a contact surface which can be brought into contact with a section of the product, wherein the suction device has at least one first suction section which is bounded in the radial direction by a sealing device and which is in communication with a pumping device generating a vacuum, wherein the shape of the first suction section is at least sectionally adaptable to a shape of the surface of the section of the product, wherein the suction section is divided into at least two segments by at least one wall section, each of the at least two segments comprising a recess from the contact surface, and wherein a surface of the wall section facing the product forms a part of the contact surface, the contact surface being substantially perpendicular to a rotational axis of the rotating blade; and at least one suction opening on the contact surface and at least one suction opening within the recess.

11. The gripper in accordance with claim 10,
wherein the suction device at least sectionally comprises an elastic material and/or has a section of modifiable stiffness.

12. The gripper in accordance with claim 10,
further comprising a sealing section, wherein the sealing section comprises at least one second suction section which is bounded in the radial direction by a second sealing device and which is in communication with the pumping device generating the vacuum.

13. The gripper in accordance with claim 12,
wherein at least one of the first sealing device and the second sealing device is at least sectionally designed as at least one of a blade edge, a bead and a sealing lip.

14. The gripper in accordance with claim 12,
wherein the suction openings are in communication with the pumping device.

15. The gripper in accordance with claim 12,
wherein at least one of the first sealing device and the second sealing device is shaped such that a local compression of the product which can be brought into contact with the sealing device can be produced.

16. The gripper in accordance with claim 12,
wherein a plurality of first suction sections or a plurality of sealing sections are provided.

17. The gripper in accordance with claim 12,
wherein the first suction section and the sealing section are separate units.

18. The gripper in accordance with claim 10,
wherein the pumping device comprises a plurality of separate pumping units and wherein a means for setting predefinable vacuum levels in the sections of the suction device is provided.

19. A method for cutting a product, using a cutting apparatus for cutting a product, wherein the cutting apparatus comprises: a product receiver for receiving the product; a feeding apparatus for feeding the product in a direction substantially perpendicular to a cutting plane defined by a rotating blade and by a cutting edge; and a gripper having a suction device for gripping an end section of the product, with a vacuum which is variable in time and/or which differs locally being generated by the suction device, the suction device having a contact surface which can be brought into contact with a section of the product, wherein the suction device comprises a suction section whichis bounded in a radial direction by a sealing device and which is in communication with the vacuum; wherein the suction section is divided into at least two segments by at least one wall section, each of the at least two segments comprising a recess from the contact surface; at least one suction opening on the contact surface and at least one suction opening within the recess; and wherein a surface of the wall section facing the product forms a part of the contact surface, the contact surface being substantially perpendicular to a rotational axis of the rotating blade.

20. The method in accordance with claim 19,
wherein the suction device has a plurality of separate suction sections in which a respective adapted vacuum is produced independently of one another.

21. The method in accordance with claim 20,
wherein at least one suction section which is arranged at a side of the gripper facing a cutting blade inlet side of the product has a larger vacuum applied at least at times than a suction section which is arranged at a side of the gripper remote from the cutting blade inlet side of the product.

22. The method in accordance with claim 19, wherein a first suction power is provided at the start of a gripping process for gripping the product in order to securely grip the product; and wherein a second suction power which is smaller than the first suction power is provided during an adjoining cutting process of the product; and/or wherein a suction power is increased in an end phase of a cutting process of the product.

23. The method in accordance with claim 19, wherein at least one of a suction power and a vacuum present in the suction device is monitored in order to detect leakage flows through the product and/or through a sealing device of the suction device.

\* \* \* \* \*